United States Patent [19]

White et al.

[11] Patent Number: 5,356,950
[45] Date of Patent: Oct. 18, 1994

[54] GRAFTED POLYMERS OF AN ISOMONOOLEFIN AND AN ALKYLSTYRENE

[75] Inventors: Donald A. White, Keasbey; Hsien C. Wang, Edison, both of N.J.

[73] Assignee: Exxon Chemical Patents Inc., Linden, N.J.

[21] Appl. No.: 53,969

[22] Filed: Apr. 26, 1993

Related U.S. Application Data

[63] Continuation of Ser. No. 674,633, Mar. 25, 1991, abandoned.

[51] Int. Cl.$^5$ .................. C08F 257/02; C08F 259/00; C08F 255/08
[52] U.S. Cl. .................. 522/116; 522/120; 525/282; 525/285
[58] Field of Search ............ 522/116, 120; 525/282, 525/285

[56] References Cited

U.S. PATENT DOCUMENTS

| | | | |
|---|---|---|---|
| 2,824,055 | 2/1958 | Lampe et al. | 522/116 |
| 3,088,931 | 5/1963 | Scanley et al. | 522/116 |
| 3,089,832 | 5/1963 | Black et al. | 522/116 |
| 3,236,917 | 2/1966 | Natta et al. | 260/878 |
| 3,438,950 | 4/1969 | Davidson | 260/78.4 |
| 3,524,904 | 8/1970 | Baxter | 522/116 |
| 3,862,265 | 1/1975 | Steinkamp et al. | 260/878 |
| 4,266,005 | 5/1981 | Nakamura et al. | 522/116 |
| 4,851,454 | 7/1989 | White et al. | 522/116 |

FOREIGN PATENT DOCUMENTS

| | | | |
|---|---|---|---|
| 0183552 | 6/1986 | European Pat. Off. | 522/116 |
| 0344021 | 11/1989 | European Pat. Off. | |

*Primary Examiner*—Susan W. Berman
*Attorney, Agent, or Firm*—Myron B. Kurtzman; M. L. Gibbons; J. E. Schneider

[57] ABSTRACT

A grafted polymer of an isomonoolefin and an alkylstyrene, such as a maleic anhydride-grafted copolymer of isobutylene and para-methylstyrene, is provided. Processes for preparing the grafted polymer are also provided.

25 Claims, No Drawings

GRAFTED POLYMERS OF AN ISOMONOOLEFIN AND AN ALKYLSTYRENE

This is a continuation of application Ser. No. 674,333, filed Mar. 25, 1991, which is based on P.M. PGL-45-90 now abandoned.

BACKGROUND OF THE INVENTION

1. Field of the Invention

The present invention relates to grafted polymers of an isomonoolefin and an alkylstyrene and a process for producing the grafted copolymers.

2. Description of Information Disclosures

Copolymers of isomonoolefins and alkylstyrene are known. See, for example, European Patent Application 8930595-9 filed May 26, 1989 (Publication No. 0344021 published Nov. 29, 1989).

U.S. Pat. No. 3,236,917 discloses an elastomer of an ethylene and a higher alpha olefin crosslinked with an unsaturated acid or anhydride.

U.S. Pat. No. 3,862,265 discloses a process for modifying polymers in the molten phase in an extruder.

It has now been found that certain copolymers of an isoolefin and an alkylstyrene can be grafted with specified unsaturated organic compounds to produce novel grafted polymers having improved properties.

SUMMARY OF THE INVENTION

In accordance with the invention there is provided a grafted polymer derived from: (a) a copolymer selected from the group consisting of a copolymer of a $C_4$ to $C_7$ isomonoolefin and an alkylstyrene, a halogen-containing copolymer of a $C_4$ to $C_7$ isomonoolefin and an alkylstyrene, and mixtures thereof, and (b) an unsaturated organic compound selected from the group consisting of an unsaturated carboxylic acid, an unsaturated carboxylic acid derivative and mixtures thereof.

DETAILED DESCRIPTION OF THE INVENTION

The grafted polymers of the present invention are reaction products of a copolymer (Reactant A) and an unsaturated organic compound (Reactant B).

Reactant A—The Copolymer

Suitable copolymers of a $C_4$ to $C_7$ isomonoolefin and an alkylstyrene which may be a mono or a polyalkylstyrene, for use as a reactant to produce the polymers of the present invention composition comprise at least 0.5 weight percent of the alkylstyrene moiety. For elastomeric copolymer products, the alkylstyrene moiety may range from about 0.5 weight percent to about 20 weight percent, preferably from about 1 to about 20 weight percent, more preferably from about 2 to about 20 weight percent of the copolymer. The preferred copolymers are copolymers of a $C_4$ to $C_7$ isomonoolefin and a para-alkylstyrene.

The copolymers of the isomonoolefin and para-alkylstyrene copolymers suitable as reactant A of the present invention include copolymers of isomonoolefin having from 4 to 7 carbon atoms and a para-alkylstyrene, such as those described in European patent application 89305395.9 filed May 26, 1989, (Publication No. 0344021 published Nov. 29, 1989). The copolymers have a substantially homogeneous compositional distribution and include the para-alkylstyrene moiety represented by the formula:

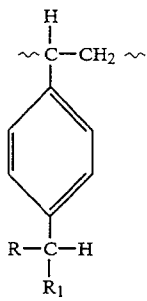

in which R and $R^1$ are independently selected from the group consisting of hydrogen, alkyl preferably having from 1 to 5 carbon atoms, primary haloalkyl, secondary haloalkyl preferably having from 1 to 5 carbon atoms, and mixtures thereof.

The preferred isomonoolefin comprises isobutylene. The preferred para-alkylstyrene comprises para-methylstyrene. Suitable copolymers of an isomonoolefin and a para-alkylstyrene include copolymers having a number average molecular weight ($\overline{M}_n$) of at least about 25,000, preferably at least about 30,000, more preferably at least about 100,000. The copolymers also, preferably, have a ratio of weight average molecular weight ($\overline{M}_w$) to number average molecular weight (e,ovs/M/ $_n$), i.e., $\overline{M}_w/\overline{M}_n$ of less than about 6, preferably less than about 4, more preferably less than about 2.5, most preferably less than about 2. The brominated copolymer of the isoolefin and para-alkylstyrene obtained by the polymerization of these particular monomers under certain specific polymerization conditions now permit one to produce copolymers which comprise the direct reaction product (that is, in their as-polymerized form), and which have unexpectedly homogeneous uniform compositional distributions. Thus, by utilizing the polymerization and bromination procedures set forth herein, the copolymers suitable for the practice of the present invention can be produced. These copolymers, as determined by gel permeation chromatography (GPC) demonstrate narrow molecular weight distributions and substantially homogeneous compositional distributions, or compositional uniformity over the entire range of compositions thereof. At least about 95 weight percent of the copolymer product has a para-alkylstyrene content within about 10 wt. percent, and preferably within about 7 wt. percent, of the average para-alkylstyrene content for the overall composition, and preferably at least about 97 wt. percent of the copolymer product has a para-alkylstyrene content within about 10 wt. percent and preferably within about 7 wt. percent, of the average para-alkylstyrene content for the overall composition. This substantially homogeneous compositional uniformity thus particularly relates to the intercompositional distribution. That is, with the specified copolymers, as between any selected molecular weight fraction the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these copolymers will also be substantially homogeneous. That is, these copolymers are essentially random copolymers, and in any particular polymer chain the para-alkylstyrene and isoolefin units will be essentially randomly distributed throughout that chain.

Suitable halogen-containing copolymers of a $C_4$ to $C_7$ isomonoolefin and a para-alkylstyrene for use as reactant A to produce the polymers of the present invention include the halogen-containing copolymers corresponding to the previously described isomonoolefin-alkylstyrene copolymers which may be obtained by halogenating the previously described copolymers. The suitable halogen-containing copolymers comprise at least 0.5 weight percent of the alkylstyrene moiety. For elastomer copolymer products, the alkylstyrene moiety may range from about 0.5 weight percent to about 20 weight percent, preferably from about 1 to 20 weight percent, more preferably from about 2 to 20 weight percent of the copolymer. The halogen content of the copolymers may range from above zero to about 7.5 weight percent, preferably from about 0.1 to about 5.0 weight percent.

The preferred halogen-containing copolymers useful in the practice of the present invention have a substantially homogeneous compositional distribution and include the para-alkylstyrene moiety represented by the formula:

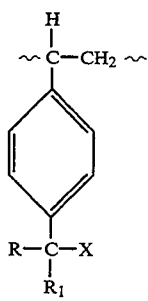

in which R and $R^1$ are independently selected from the group consisting of hydrogen, alkyl preferably having from 1 to 5 carbon atoms, primary haloalkyl, secondary haloalkyl preferably having from 1 to 5 carbon atoms, and mixtures thereof and X is selected from the group consisting of bromine, chlorine and mixtures thereof, such as those disclosed in European patent application 8930595.9 filed May 26, 1989, (Publication No. 0344021 published Nov. 29, 1989). Preferably, the halogen is bromine.

Various methods may be used to produce the copolymers of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about minus 35° C. to about minus 100° C., preferably from about minus 40° to about minus 80° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 wt. percent of polymer are possible.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene chloride, chloroform, carbon tetrachloride, methyl chloride, with methyl chloride being particularly preferred.

An important element in producing the copolymer is the exclusion of impurities from the polymerization reactor, namely, impurities which, if present, will result in catalyst poisoning or excessive molecular weight depression complexing with the catalyst or copolymerization with the isomonoolefins or the para-alkylstyrene, which in turn will prevent one from producing the para-alkylstyrene copolymer product useful in the practice of the present invention. Most particularly, these impurities include the catalyst poisoning material, moisture and other copolymerizable monomers, such as, for example, meta-alkylstyrenes and the like. These impurities should be kept out of the system.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt. percent and preferably from about 0.01 to 0.2 wt. percent, based upon the total amount of monomer to be polymerized.

Halogenation of the polymer can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. No. 4,548,995, which is hereby incorporated by reference.

Suitable solvents for solution halogenation include the low boiling hydrocarbons ($C_4$ to $C_7$) and halogenated hydrocarbons. Since the high boiling point of para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

With halogenation of para-methylstyrene/isobutylene copolymers, it is possible to halogenate the ring carbons, but the products are rather inert and of little interest. However, it is possible to introduce halogen desired functionality into the para-methylstyrene/isobutylene copolymers hereof in high yields and under practical conditions without obtaining excessive polymer breakdown, cross-linking or other undesirable side reactions.

It should be noted that radical bromination of the enchained para-methylstyryl moiety in the copolymers for the practice of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the suitable para-methylstyrene/isobutylene copolymers in hydrocarbon solvents such as pentane, hexane or heptane can be selectively brominated using light, heat, or selected radical initiators (according to conditions, i.e., a particular radical initiator must be selected which has an appropriate half-life for the particular temperature conditions being utilized, with generally longer half-lives preferred at warmer halogenation temperatures) as promoters of radical halogenation, to yield almost exclusively the desired benzylic bromine functionality, via substitution on the para-methyl group, and without appreciable chain scission and/or cross-linking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or with the solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and 1 percent by weight on the copolymer, preferably between about 0.02 and 0.3 percent. The preferred initiators are bis azo compounds, such as azo bis isobutyronitrile (AIBN), azo bis (2,4 dimethyl valero) nitrile, azo bis (2 methyl butyro) nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as cross-linking. The radical bromination reaction of the copolymers of para-methylstyrene and isobutylene can be highly selective, and almost exclusively produces the desired benzylic bromine functionality. Indeed, the only major side reaction which appears to occur is disubstitution at the para-methyl group, to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the para-methylstyrene content.

It is desirable that the termination reactions be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombination and possible cross-linking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyryl moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively non-reactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers can be recovered and finished using conventional means with appropriate stabilizers being added to yield highly desirable and versatile functional saturated copolymers.

In summary, halogenation to produce a copolymer useful in the present invention is preferably accomplished by halogenating an isobutylene-para-methylstyrene copolymer using bromine in a normal alkane (e.g., hexane or heptane) solution utilizing a bis azo initiator, e.g., AIBN or VAZO ® 52: 2,2'-azobis(2,4-dimethylpentane nitrile), at about 55° to 80° C. for a time period ranging from about 4.5 to about 30 minutes, followed by a caustic quench. The recovered polymer is washed in basic water wash and water/isopropanol washes, recovered, stabilized and dried.

Reactant B—The Unsaturated Organic Compound

Suitable unsaturated organic compound for use as reactant with the copolymer include unsaturated carboxylic acids, unsaturated carboxylic acid derivatives and mixtures thereof. The carboxylic acid may be a mono or polycarboxylic acid, preferably having from 3 to 12 carbon atoms. By way of example, the unsaturated carboxylic acid may be maleic acid, fumaric acid, citraconic acid, mesaconic acid, itaconic acid, himic acid, acetylenedicarboxylic acid and mixtures thereof. The preferred carboxylic acid is maleic acid. The unsaturated carboxylic acid derivative may be a cyclic acid anhydride, an amide, an imide, an ester and mixtures thereof. Suitable cyclic acid anhydrides include maleic anhydride, citraconic anhydride, itaconic anhydride, and himic anhydride. The preferred anhydride is maleic anhydride.

Suitable esters include mono- and di-esters of diacids specified above, e.g. monomethyl maleate, dimethyl maleate, diethyl maleate, diphenyl maleate, dibutyl fumarate.

Suitable amides include mono- and di-amides of diacids specified above, e.g. maleamic acid, N-methylmaleamic acid, maleanilic acid.

Suitable imides include imides of diacids specified above, e.g. maleimide, N-methylmaleimide, N-phenylmaleimide.

The preferred carboxylic acid derivatives are selected from the group consisting of maleic anhydride, a dialkyl maleate, itaconic anhydride, himic anhydride, an alkylmaleamide, an N-alkylmaleimide, an alkylmaleate and mixtures thereof.

The component (B) may be present in the grafted polymer of the present invention in an amount ranging from about 0.5 to 0.001 millimole (mmole) per gram, preferably from about 0.2 to 0.002 mmole per gram, more preferably from about 0.1 to 0.005 mmole per gram of the grafted polymer product.

The Process

The grafted polymers of the present invention are prepared by reacting a copolymer, Reactant A previously described, with an unsaturated organic compound, Reactant B previously described, in the presence of a free radical initiator at grafting reaction conditions in a reaction zone.

When it is desired to graft a derivative of an acid or anhydride onto the copolymer (Reactant A), instead of reacting the copolymer with the acid derivative, the copolymer (Reactant A) may be reacted with the unsaturated carboxylic acid or anhydride and the resulting carboxylic acid grafted or carboxylic acid anhydride grafted polymer may subsequently be reacted with a desired functional group-containing compound. For example, the maleic anhydride grafted copolymer may be reacted with an amine, $RNH_2$, as shown in the following schematic equation wherein —MM— denotes the polymer chain and R is an alkyl group:

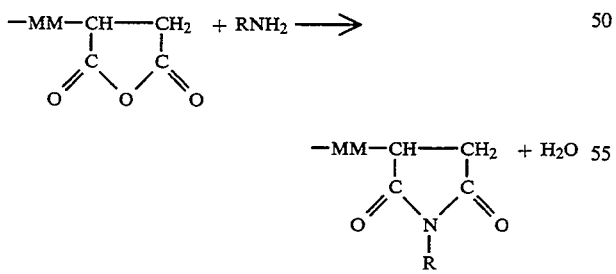

The copolymer of isobutylene and an alkylstyrene or the corresponding halogenated copolymer (Reactant A) is contacted with Reactant B in the presence of a free radical initiator which may be a chemical compound or radiation. Suitable free radical initiators include (1) thermally decomposable compounds which generate radicals such as azo compounds or organic peroxides; (2) compounds which generate free radicals by non-thermal methods such as photochemical or redox processes; (3) compounds which have inherent radical character such as molecular oxygen; or (4) electromagnetic radiation such as X-rays, electron beams, visible light, ultraviolet-light.

Suitable organic peroxide compounds include hydroperoxides, dialkyl peroxides, diacyl peroxides, peroxyesters, peroxydicarbonates, peroxyketals, ketone peroxides and organosulfonyl peroxides.

Preferably, the free radical initiator is an organic peroxide compound having a half-life, at the reaction temperature, of less than one tenth of the reaction/residence time employed.

When the free radical initiator is a compound, suitable molar ratio of free radical initiator compound to Reactant B may range from 0.001:1 to 1:1, preferably from 0.01:1 to 0.1:1.

Desirably, the molar amount of Reactant B expressed in mmoles per gram, in the contacting zone may be 1 to 10 times the molar amount of these components as is desired in the final grafted copolymer. Thus, when the molar amount of B in the grafted copolymer is 0.05 mmoles per gram of product polymer, the amount of B introduced in the reaction zone is suitably from about 0.05 to about 0.5 mmoles per gram of component A plus component B present in the reaction mixture.

The grafting reaction may be conducted in the absence of a diluent or in the presence of a diluent.

When a diluent is present in the reaction zone, suitable diluents include saturated aliphatic hydrocarbons, aromatic hydrocarbons, and perhalogenated hydrocarbons.

Preferably, the grafting reaction to produce the grafted polymer of the present invention is conducted in the absence of a diluent and in the melt phase, wherein the copolymer (Reactant A) is in the molten phase. The reaction temperature is chosen to be appropriate for the initiator used.

Suitable reaction conditions include a temperature ranging from about 0° C. to about 300° C. The suitable reaction temperature will vary according to the free radical initiator used. When an azo compound is used as the initiator, suitable temperatures will generally range from about 25° to 100° C. When an organic peroxide is used as initiator, suitable temperatures range from about 25° to about 250° C. Higher temperatures may be used for other types of free radical initiators. When the reaction is conducted in the presence of a diluent, i.e. solution processes, the reaction temperature will generally be below 150° C. For melt phase processes, (i.e., bulk phase processes), the reaction temperature may range from about 25° such as in conventional electron beam irradiation equipment to about 250° C. such as in polymer mixing equipment. The process for producing the grafted polymers of the present invention may be conducted as a batch process or as a continuous process.

The reaction is performed in a suitable reaction zone which may be a polymer mixing device such as a Banbury mixer, a single or multiple screw extruder and the like for melt phase polymers or a glass flask, metal tank or tube when the process is conducted in the presence of a diluent.

When the molten copolymer itself is the reaction medium, uniform dispersion of the grafting agent and of the initiator is preferably performed by predispersion or by the incorporation of suitable mixing elements into the reactor (e.g., incorporation of mixing screw sections in an extruder). When electromagnetic radiation is used, dispersion of the initiator will include uniform exposure of all parts of the copolymer or copolymer solution to the beam.

In a preferred embodiment, the grafting process to produce the grafted polymer of the invention is carried out in a twin screw extruder having, in sequence, screw elements, which will (i) heat the polymer by shear and compression to or close to the desired reaction temperature, (ii) mix the copolymer at or close to reaction temperature with the grafting agent, (iii) mix the copolymer containing the grafting agent with the initiator, (iv) allow appropriate residence time for the grafting reaction, (v) allow venting of unreacted grafting agent and initiator coproducts, (vi) allow mixing of any desired stabilizers or additives and (vii) forward the reacted, vented stabilized polymer to an appropriate finishing device (e.g. drumming device, baler, pelletizer, etc.).

The grafted polymers of the present invention may be used as bonding polymers, compatibilizers for polymer blends, toughening agents for engineering plastics, tie layers for multilayer coextruded films, and the like.

The following examples are presented to illustrate the invention.

The isobutylene copolymers, dried by heating in a vacuum oven, used in the Examples, are shown in Table I.

TABLE I

| Co-polymer | P-Methyl-styrene Comonomer (weight %) | Bromine (weight %) | $\overline{M_w}$ (kg/mole) | $\overline{M_n}$ (kg/mole) |
|---|---|---|---|---|
| A | 5.0 | 0.0 | 283 | 136 |
| B | 7.4 | 0.0 | 368 | 170 |
| C | 15.0 | 0.0 | 289 | 113 |
| D | 4.6 | 1.0 | 259 | 99 |
| E | 10.0 | 0.0 | | |

The grafting agents, N-ethylmaleimide and maleic anhydride were obtained from Aldrich Chemical Company and had purities of 98 and 99%, respectively. The peroxide initiator, Lupersol TM 130, was obtained from Atochem North America and contained 90 to 95% 2,6-di-(t-butylperoxy)-2,6-dimethylhex-3-yne. $\overline{M_w}$ denotes weight average molecular weight. $\overline{M_n}$ denotes number average molecular weight.

EXAMPLE 1 to 4

In these examples, copolymers A, B, C and D were grafted with N-ethylmaleimide. The reactions were carried out in a 45 ml Brabender mixer. To avoid contact of the undiluted peroxide initiator with hot metal, it was fed as a 4 percent by weight masterbatch in the copolymer used for that particular example. The masterbatches were prepared on a rubber mill.

The copolymer, A, B, C or D (27.0 g), was charged to the Brabender mixer and brought to 210° C. by external heating and internal mixing. N-ethylmaleimide (1.5 g; 0.40 mmole/g of reaction mixture) was added followed by the peroxide masterbatch (1.5 g; 4% peroxide in copolymer A, B, C or D). Mixing at 210° C. with a rotor speed of 60 rpm was continued for 3 minutes, timed from the addition of the peroxide masterbatch.

Infrared spectra of the products were obtained using thin films made in a Carver press (110°-130° C., 500 psig, 6 seconds) between Teflon TM coated fiberglass sheets. In all 4 spectra an intense band at about 1715 $cm^{-1}$ was observed and is attributed to the grafted imide. This band did not diminish when the films were stood at room temperature overnight in a steady flow of air. This treatment will normally cause loss of any unreacted imide. The results indicate little or no unreacted N-ethylmaleimide in the 4 products.

The grafted maleimide was quantified as follows. A sample (5 g) was dissolved by stirring with hexane (100 ml) overnight. The dissolved polymer was precipitated with methanol and dried in a vacuum oven at 50° C. for about 66 hours. The dried products were submitted for nitrogen analysis using a Carlo Erba instrument. The results are shown in Table II.

TABLE II

| | | GRAFTING WITH N-ETHYLMALEIMIDE | | |
|---|---|---|---|---|
| EXAMPLE | COPOLYMER | NITROGEN CONTENT wt % | GRAFTED IMIDE CONTENT mmole/g | GRAFTING EFFICIENCY % |
| 1 | A | 0.52 | 0.37 | 93 |
| 2 | B | 0.49 | 0.35 | 88 |
| 3 | C | 0.45 | 0.32 | 80 |
| 4 | D | 0.46 | 0.33 | 83 |

The absence of detectable free N-ethylmaleimide in the products is taken to indicate that its conversion is essentially quantitative. The deviations from 100% efficiency evident in Table II are attributed largely to evaporative losses of N-ethylmaleimide from the open Brabender mixer.

Comparative Example 5

In this example, grafting of maleic anhydride to polyisobutylene is examined as a comparison for examples 6 to 9 below. The reactions were carried out in a 45 ml Brabender mixer.

Polyisobutylene ($M_w$=853 kg, $M_n$=358 kg; 27.0 g) was charged to the Brabender mixer and brought to 210° C. by external heating and internal mixing. Maleic anhydride (1.5 g; 0.51 mmole/g of reaction mixture) was added followed by the peroxide masterbatch (1.5 g; 4% peroxide in the same polyisobutylene). Mixing at 210° C. with a rotor speed of 60 rpm was continued for 3 minutes, timed from the addition of the peroxide masterbatch.

The recovered material was heated in a vacuum oven at 140° C. for 18 hours to remove unreacted maleic anhydride. Its infrared spectrum was recorded using a thin film made in a Carver press (110°-130° C., 500 psig, 6 seconds) between Teflon TM coated fiberglass sheets and showed small bands due to grafted maleic anhydride and maleic acid at about 1790 and 1715 $cm^{-1}$, respectively.

The acid was the minor component and its presence is attributed to hydrolysis of the anhydride by atmospheric moisture. The ratio of the sum of the absorbances of these two bands to that of a typical polyisobutylene band at about 950 $cm^{-1}$ was used as a measure of the functionality introduced into the polymer. By comparison of this ratio with the similar ratio for a series of blends of dodec-2-enylsuccinic anhydride and polyisobutylene, an estimate of the sum of the grafted maleic anhydride and maleic acid content of the recovered material was obtained and is indicated in Table III.

tense band at about 1715 cm$^{-1}$ was observed and is attributed to the grafted imide. The films were soaked in acetone overnight to remove unreacted benzylamine, dried in air and analysed for nitrogen using a Carlo Erba instrument. The results are shown in Table IV.

TABLE III

| | | GRAFTING WITH MALEIC ANHYDRIDE | | |
|---|---|---|---|---|
| EX. | COPOLYMER | P-METHYL-STYRENE CONTENT wt % | INFRARED ABSORBANCE RATIO* | ESTIMATED ANHYDRIDE PLUS ACID mmole/g | ESTIMATED GRAFTING EFFICIENCY % |
| 5 | Polyisobutylene | 0.0 | 0.19 | 0.04 | 8 |
| 6 | A | 5.0 | 0.28 | 0.06 | 12 |
| 7 | B | 7.4 | 0.64 | 0.13 | 26 |
| 8 | E | 10.0 | 0.70 | 0.14 | 28 |
| 9 | C | 15.0 | 0.63 | 0.13 | 26 |

*ABSORBANCE RATIO = [a(1790) + a(1715)]/a(950)

TABLE IV

| | | DERIVATIZATION OF MALEATED COPOLYMERS | | | |
|---|---|---|---|---|---|
| EX. | COPOLYMER | P-METHYL STYRENE CONTENT WT % | NITROGEN CONTENT RATIO* | NITROGEN CONTENT mmole/g | ESTIMATED GRAFTING EFFICIENCY[1] % |
| 10 | B | 7.4 | 0.24 | 0.17 | 33 |
| 11 | E | 10.0 | 0.20 | 0.14 | 27 |
| 12 | C | 15.0 | 0.22 | 0.16 | 31 |

[1]Estimated efficiency for maleic anhydride grafting assuming quantitative imide formation.

EXAMPLES 6 to 9

In these examples, copolymers A, B, E and C respectively were grafted with maleic anhydride. The reactions were carried out in a 45 ml Brabender mixer.

The copolymer, A, B, E or C (27.0 g), was charged to the Brabender mixer and brought to 210° C. by external heating and internal mixing. Maleic anhydride (1.5 g; 0.51 mmole/g of reaction mixture) was added followed by the peroxide masterbatch (1.5 g; 4% peroxide in copolymer A, B, E or C). Mixing at 210° C. with a rotor speed of 60 rpm was continued for 3 minutes, timed from the addition of the peroxide masterbatch.

The recovered products were heated in a vacuum oven at 140° C. for 18 hours to strip unreacted maleic anhydride. The grafted maleic anhydride plus maleic acid content of the stripped products was estimated as described in Example 5 and the results are shown in Table 2. They indicate that while very low grafting efficiencies are observed with no para-methylstyrene comonomer (comparative Example 5), reasonable grafting efficiencies can be obtained by the use of copolymers with comonomer contents of 7.4 wt % or higher.

EXAMPLES 10 to 12

Maleated copolymers were prepared in the manner of Examples 7 to 9. The stripped products were then reacted with benzylamine to form the benzylmaleimide derivative. The benzylamine reactions were carried out as follows.

The vacuum stripped maleated polymer (28.5 g) was charged to a 45 ml Brabender mixer and brought to 170° C. by external heating and internal mixing. Benzylamine (1.5 g; 0.47 mmole/g of reaction mixture) was added. Mixing at 170° C. with a rotor speed of 60 rpm was continued for 6 minutes, timed from the addition of the benzylamine.

Infrared spectra of the products were obtained using thin films made as noted above. In all 3 spectra an in-

What is claimed is:

1. A grafted polymer derived from
(A) a copolymer selected from the group consisting of a copolymer of a $C_4$ to $C_7$ isomonoolefin and an alkylstyrene, a halogen-containing copolymer of a $C_4$ to $C_7$ isomonoolefin and an alkylstyrene, and mixtures thereof, and
(B) an unsaturated organic compound which grafts to the alkyl group bonded at the styrene ring of the copolymer, the compound selected from the group consisting of an unsaturated carboxylic acid, an unsaturated carboxylic acid derivative and mixtures thereof.

2. The grafted polymer of claim 1, wherein the moiety derived from said unsaturated organic compound B is present in said grafted polymer in an amount ranging from about 0.5 to 0,001 millimole per gram of said grafted polymer.

3. The grafted polymer of claim 1, wherein said copolymer (A) is selected from the group consisting of a copolymer of isobutylene and para-methylstyrene, a halogen-containing copolymer of isobutylene and para-methylstyrene and mixtures thereof.

4. The grafted polymer of claim 1, wherein said copolymer (A) is a copolymer of isobutylene and para-methylstyrene.

5. The grafted polymer of claim 1, wherein said copolymer (A) is a bromine-containing copolymer of isobutylene and para-methylstyrene.

6. The grafted polymer of claim 1 wherein said unsaturated organic compound is a carboxylic acid selected from the group consisting of a $C_3$ to $C_{12}$ monocarboxylic acid, a $C_3$ to $C_{12}$ polycarboxylic acid and mixtures thereof.

7. The grafted polymer of claim 6, wherein said carboxylic acid is a polycarboxylic acid selected from the group consisting of maleic acid, fumaric acid, citraconic acid, mesaconic acid, itaconic acid, himic acid, acetylenedicarboxylic acid and mixtures thereof.

8. The grafted polymer of claim 1, wherein said unsaturated organic compound is a carboxylic acid derivative selected from the group consisting of a cyclic acid anhydride, an amide, an imide, an ester, and mixtures thereof.

9. The grafted polymer of claim 8, wherein said carboxylic acid derivative is selected from the group consisting of maleic anhydride, himic anhydride, itaconic anhydride, a dialkyl maleate, an N-alkylmaleimide, a dialkyl fumarate, and mixtures thereof.

10. The grafted polymer of claim 1, wherein said copolymer (A) is a copolymer of isobutylene and para-methylstyrene and said unsaturated organic compound (B) is selected from the group consisting of maleic anhydride, N-ethylmaleimide, and mixtures thereof.

11. The grafted polymer of claim 10, wherein the moiety derived from said unsaturated organic compound B is present in said grafted polymer in an amount ranging from about 0.5 to 0.001 millimoles per gram of said grafted polymer.

12. A grafted polymer comprising a copolymer of a $C_4$ to $C_7$ isomonoolefin and an alkylstyrene, or a halogen-containing copolymer of a $C_4$ to $C_7$ isomonoolefin and an alkylstyrene, and mixtures thereof having grafted to the alkyl group bonded to the styrene a group derived from an unsaturated carboxylic acid, an unsaturated carboxylic acid derivative and mixtures thereof.

13. The grafted copolymer of claim 12 wherein said copolymer is selected from the group consisting of a copolymer of isobutylene and para-methylstyrene, a halogen-containing copolymer of isobutylene and para-methylstyrene and mixtures thereof.

14. The copolymer of claim 12 wherein said copolymer is a copolymer of isobutylene and para-methylstyrene or isobutylene, paramethyl styrene and halogenated para-methylstyrene.

15. The copolymer of claim 12 wherein the copolymer is a bromine-containing copolymer of isobutylene and para-methylstyrene.

16. A process for producing a grafted polymer which comprises the step of contacting (A) a copolymer selected from the group consisting of a copolymer of a $C_4$ to $C_7$ isomonoolefin and an alkylstyrene, a halogen-containing copolymer of a $C_4$ to $C_7$ isomonoolefin and an alkylstyrene, and mixtures thereof, with (B) an unsaturated organic compound selected from the group consisting of an unsaturated carboxylic acid, an unsaturated carboxylic acid derivative and mixtures thereof, in the presence of a free radical initiator, at reaction conditions in a reaction zone.

17. The process of claim 16, wherein said free radical initiator is a compound selected from the group consisting of, organic peroxides, molecular oxygen and mixtures thereof.

18. The process of claim 16, wherein said free radical initiator is an electromagnetic radiation.

19. The process of claim 16, wherein said contacting step is conducted in the presence of a diluent.

20. The process of claim 16, wherein said contacting step is conducted in the absence of a diluent and wherein said copolymer A is in the molten state.

21. The process of claim 16, wherein said reaction conditions include a temperature ranging from about 25° to about 300° C.

22. The process of claim 16, wherein said unsaturated organic compound (B) is present in said reaction zone in an amount sufficient to produce a grafted polymer having from about 0.5 to about 0.001 millimoles of said component B per gram of said grafted polymers.

23. The process of claim 16, wherein said free radical initiator is a compound and wherein said compound is present in said reaction zone in a molar ratio of said free radical initiator to very unsaturated compound B.

24. The process of claim 16, wherein said copolymer A is selected from the group consisting of a copolymer of isobutylene and para-methylstyrene, a bromine-containing copolymer of isobutylene and para-methylstyrene, and mixtures thereof.

25. The process of claim 16 or claim 24, wherein said unsaturated organic compound is selected from the group consisting of maleic anhydride, N-ethylmaleimide and mixtures thereof.

* * * * *